No. 893,689. PATENTED JULY 21, 1908.
J. W. WOODLING & B. H. CONFER.
CAB LIGHT.
APPLICATION FILED DEC. 31, 1907.
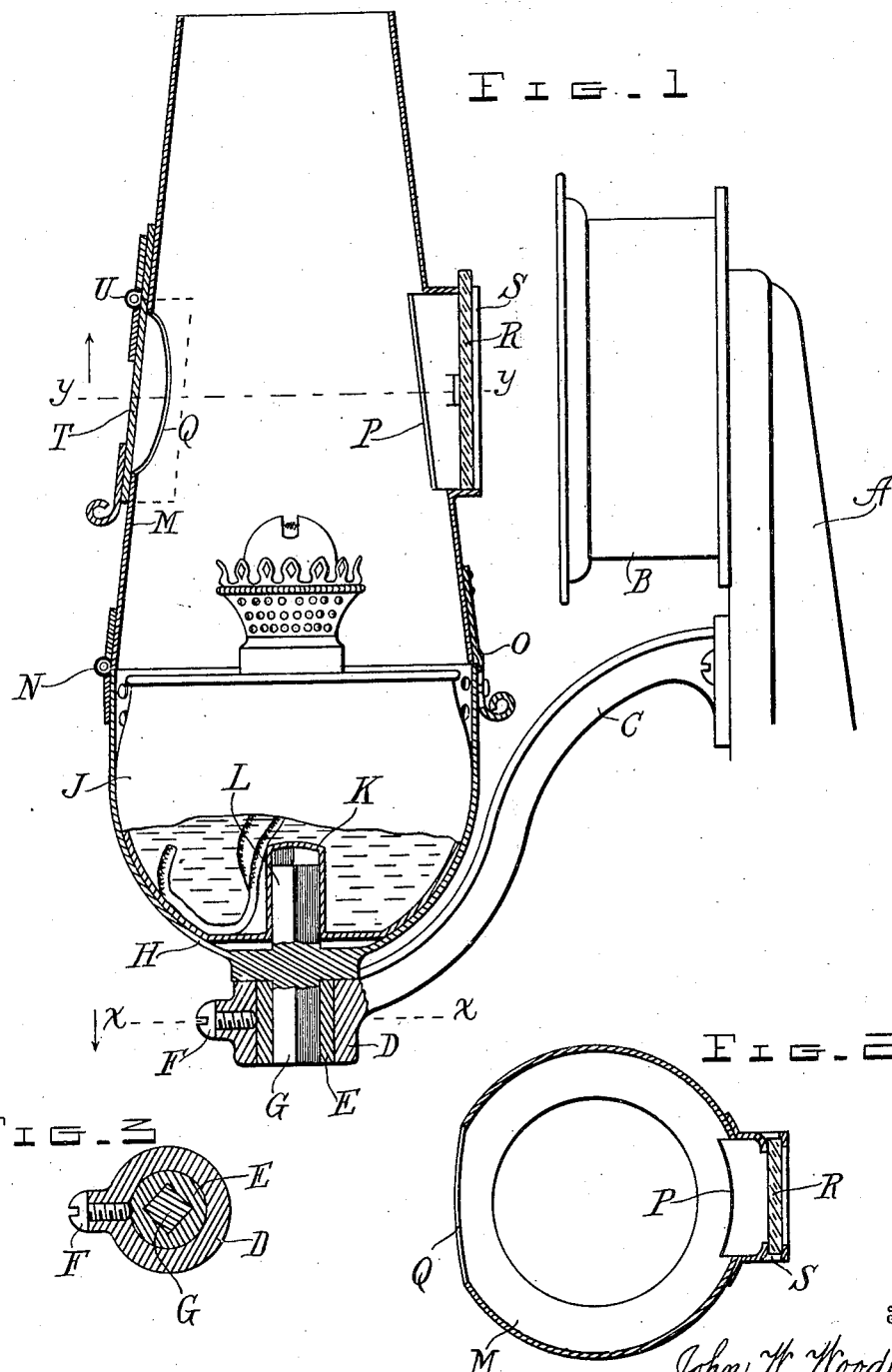
Witnesses
B. J. Crawford.
W. Taylor Birch.
Inventors
John W. Woodling,
Benjaman H. Confer,
By Edwin Guthrie,
Attorney

UNITED STATES PATENT OFFICE.

JOHN W. WOODLING AND BENJAMAN H. CONFER, OF ALBION, PENNSYLVANIA.

CAB-LIGHT.

No. 893,689.        Specification of Letters Patent.        Patented July 21, 1908.

Application filed December 31, 1907. Serial No. 408,815.

*To all whom it may concern:*

Be it known that we, JOHN W. WOODLING and BENJAMAN H. CONFER, citizens of the United States, residing at Albion, in the county of Erie and State of Pennsylvania, have invented certain new and useful Improvements in Cab-Lights, of which the following is a specification.

Our invention relates to cab lights, more particularly stated, to lamps intended for use in fixed position within the cab of a locomotive engine to throw light upon the faces of one or more gages, or from which the light may be directed upon a given object without lighting the interior of the cab to any extent.

The object of our invention is to produce an illuminating device of the general character mentioned and having special construction and particular arrangement of parts whereby economy of manufacture, stability of position, and convenience of using are believed to be secured to a greater degree than in any of those lamps for like purpose with which we are acquainted.

We accomplish the object stated by fashioning and associating the parts substantially as illustrated in the accompanying drawings, of which Figure 1 represents a side view mainly in vertical section. Fig. 2 is a section of the chimney on the line *y—y* of Fig. 1 looking upward, and Fig. 3 is a horizontal section on line *x—x* of Fig. 1 looking downward.

Like letters of reference are used to designate the same parts throughout the specification and drawings.

Upon a suitable stand A is secured a gage B. It is desired, particularly within the cab of a locomotive engine, or in the pilot house of a steamboat, that so far as practicable only the face of the gage shall be lighted without lighting the interior of the compartment in order that the engineer or pilot may see distinctly the objects ahead. To effect this result in accordance with our invention, we construct the supporting bracket C, attached to the stand A at one end, and provided at its outer end with a head D. Fitting within the head D is a sleeve E. It is intended that the sleeve E shall fit closely the orifice provided for it in the head D. It is believed to be shown in Figs. 1 and 3 that the sleeve E may be turned in the head D and its position fixed by means of the set screw F, which will be again referred to.

The passage through the sleeve E is of rectangular cross-section and within it fits a square stem G projecting downwardly from the cup H. Here it may be stated that by reason of the engagement of the square stem and the correspondingly shaped passage through sleeve E, when the cup H is once placed in position, that position cannot change. In other words, the cup H cannot now be jolted or jarred in such manner as to turn it around with respect to the head D.

Within the cup H is seated the bowl J of a lamp. Usually, although not essentially, the bowl has a seat or socket K of square cross-section adapted to receive the upwardly-projecting stem L with which the cup H is interiorly provided. Thus, the bowl of the lamp cannot turn around with respect to the cup H, and it cannot be displaced in any direction when the construction illustrated in Fig. 1 is employed. It may be lifted out of the cup to be filled, but, the ordinary jar or rocking of a locomotive engine whatever its speed does not affect the position of the cup or the lamp.

The chimney M is not attached to the lamp, but, is pivotally connected with the cup H by the hinge N. The chimney is opaque and customarily made of sheet metal. It is kept closed by a spring latch O.

Through a suitable opening P in the side of the chimney the light passes upon the face of the gage, and the opening is of such size that only the face of the gage is lighted. The opening is covered by the plate of glass R, removably held in guide grooves S. It is usual to so fashion the holding grooves S that the glass R will rest vertically. Upon the other side of the chimney is an opening Q, having a cover T pivotally connected to the chimney by the hinge U, and normally the cover T closes the opening Q against the passage of light, the cover being sheet metal. The opening Q is intended to permit the passage of a stream of light in a given direction, sufficient in quantity to enable an engineer to conveniently read his train orders, but not enough to light up the inside of the cab to any extent.

It is believed to be now made out that the cup to which the chimney is attached, having once been adjusted to throw light on the face of the gage B, will not be disturbed. Furthermore, the cup may be lifted out for any purpose and replaced in precisely the same position owing to the construction of the parts described. To adjust the light properly upon the face of the gage, especially when the gage is not directly over bracket C, the sleeve E may be turned in head D and its position fixed by the set screw. Obviously, other openings P may be provided in the chimney when more than one gage is to be lighted.

Having now described our invention and explained the mode of its operation, what we claim is—

1. In a cab light, the combination with a cup having a squared stem, of a support provided with a corresponding orifice constructed to receive the said stem, a lamp having a bowl adapted to be placed in the cup, the cup and lamp bowl having mutually engaging devices whereby the bowl is held against tilting and lateral displacement, and an opaque chimney having openings for the passage of light, the said chimney being connected with the said cup and thereby held against rotative displacement with respect to the cup, substantially as described.

2. In a cab light, the combination with a cup having a squared stem, of a support having a rotatively adjustable sleeve provided with a corresponding orifice constructed to receive the said stem, a lamp having a bowl adapted to be placed in the cup, the cup and lamp bowl having mutually engaging devices whereby the bowl is held against tilting and lateral displacement, and an opaque chimney having openings for the passage of light, the said chimney being connected with the said cup and thereby held against rotative displacement with respect to the cup, substantially as described.

In testimony whereof we affix our signatures in presence of two witnesses.

JOHN W. WOODLING.
BENJAMAN H. CONFER.

Witnesses:
  E. F. DAVENPORT,
  JOHN J. BANCROFT.